(12) United States Patent
Nagaoka

(10) Patent No.: US 6,441,335 B1
(45) Date of Patent: Aug. 27, 2002

(54) PROCESS FOR BEAM-WELDING TWO MEMBERS DIFFERENT IN HARDNESS

(75) Inventor: Takahiro Nagaoka, Kakuda (JP)

(73) Assignee: Keihin Corporation, Tokyo (JP)

( * ) Notice: Subject to any disclaimer, the term of this patent is extended or adjusted under 35 U.S.C. 154(b) by 76 days.

(21) Appl. No.: 09/666,587

(22) Filed: Sep. 20, 2000

(30) Foreign Application Priority Data

Sep. 24, 1999 (JP) ............................................ 11-270684

(51) Int. Cl.[7] .......................... B23K 15/00; B23K 26/20
(52) U.S. Cl. .............................. 219/121.14; 219/121.64
(58) Field of Search ........................ 219/121.6, 121.63, 219/121.64, 121.82, 121.85, 121.13, 121.14; 228/232, 234.1, 262.41

(56) References Cited

U.S. PATENT DOCUMENTS 4,270,496 A * 6/1981 Narasimhan et al. .... 123/90.51

FOREIGN PATENT DOCUMENTS

JP 411005183 A * 1/1999 ............ 219/121.64

* cited by examiner

Primary Examiner—Samuel M. Heinrich
(74) Attorney, Agent, or Firm—Arent Fox Kintner Plotkin & Kahn, PLLC

(57) ABSTRACT

In welding joint surfaces of a high-hardness member and a low-hardness member to each other by use of a laser beam or an electron beam, the point of irradiation of the laser beam or electron beam is offset from the joint surfaces of the high-hardness member and the low-hardness member toward the low-hardness member by a predetermined distance, such that the melting provided by the beam is caused to spread from the low-hardness member to the high-hardness member. Thus, even if the two members different in hardness from each other are welded together by use. of the laser beam or electron beam, it is possible to avoid a poor weld, which would otherwise cause a cracking in the high-hardness member.

3 Claims, 4 Drawing Sheets

PROCESS FOR BEAM-WELDING TWO MEMBERS DIFFERENT IN HARDNESS

BACKGROUND OF THE INVENTION

1. Field of the Invention

The present invention relates to an improvement in a process for beam-welding two members different in hardness from each other, that is, high and low in hardness, wherein joint surfaces of the high-hardness and low-hardness members are welded to each other by use of a laser beam or an electron beam.

2. Description of the Related Art

In the prior art, even when joint surfaces of high-hardness and low-hardness members are welded to each other by use of a laser beam or an electron beam, a point of irradiation of the laser beam or the electron beam is set on the joint surfaces of the two members, similarly as when two members having the same hardness are welded to each other.

However, in the welding of the joint surfaces of the high-hardness and low-hardness members to each other by use of the laser beam or electron beam, if the point of irradiation of the laser beam or electron beam is set on the joint surfaces of the two members, a poor weld often occurs for the following reasons:

(1) The heat input is too strong for the high-hardness member and for this reason, the high-hardness member is brought into a rehardened state, resulting in a cracking produced.

(2) Even if no cracking is produced immediately after the welding, a cracking may be produced in some cases due to a variation in temperature during service of the welded members.

(3) The melting of the high-hardness member during the welding is large and for this reason, a large amount of carbide is precipitated during solidification of the high-hardness member, which causes a cracking in the weld zone.

SUMMARY OF THE INVENTION

Accordingly, it is an object of the present invention to provide a process for beam-welding two members different in hardness from each other, wherein a poor weld as described above can be avoided to the utmost.

To achieve the above object, according to a first aspect and feature of the present invention, there is provided a process for joint surfaces of a high-hardness member and a low-hardness member are welded to each other by use of a laser beam or an electron beam, wherein a point of irradiation of the laser beam or the electron beam is set at a location offset from the joint surfaces of the high-hardness member and the low-hardness member toward the low-hardness member by a predetermined distance, so as to cause the melting provided by the beam to spread from the low-hardness member to the high-hardness member. The high-hardness member corresponds to a valve seat member 12 and a valve member 19 in an embodiment of the present invention, which will be described hereinafter, and the low-hardness member corresponds to a housing body 11 and a valve rod 18 in the embodiment.

With the first feature, the following merits can be achieved:

(1) when the welding using the laser beam or the electron beam is started, the melting first occurs in the low-hardness member and then spreads to a periphery of the low-hardness member to ultimately reach the high-hardness member. Therefore, the melting in the high-hardness member is advanced relatively slowly without reception of a direct heat input provided by the laser beam and hence, the high-hardness member is not brought into a rehardened state in which a cracking is liable to occur;

(2) the melting of the low-hardness member is larger than that of the high-hardness member and hence, the low-hardness member difficult to crack is molten into the high-hardness member, and a cracking-causing element in the high-hardness member is diluted with the low-hardness member; and (3) the melting of the high-hardness member is smaller than that of the low-hardness member and hence, the variation in temperature up to the solidification of the high-hardness member is also relatively small and thus, the precipitation of a carbide from the high-hardness member can be inhibited.

Consequently, the joint zones of the high-hardness member and the low-hardness member can be welded, while avoiding a poor weld such as cracking of the high-hardness member to the utmost. Even during service of both the members, it is possible to prevent a cracking from occurring in the weld zones of the members.

According to a second aspect and feature of the present invention, in addition to the first feature, the high-hardness member is a spherical valve member of an electromagnetic fuel injection valve, and the low-hardness member is a valve rod welded to the valve member; and wherein the laser beam or the electron beam is emitted to the point of irradiation offset from the joint surfaces of the valve member and the valve rod toward the valve rod by the predetermined distance, so as to cause the melting provided by the beam to spread from the valve rod to the valve member.

With the second feature, the joint zones of the valve member and the valve rod of an electromagnetic fuel injection valve can be welded to each other, while avoiding a poor weld such as cracking to the utmost. In addition, even during service of the valve member and the valve rod, it is possible to prevent a cracking from occurring in the weld zones of the valve member and the valve rod.

According to a third aspect and feature of the present invention, in addition to the fist feature, the high-hardness member is a valve seat member of an electromagnetic fuel injection valve, and the low-hardness member is a valve housing body welded to a rear end of the valve seat member; and wherein the laser beam or the electron beam is emitted to the point of irradiation offset from the joint surfaces of the valve seat member and the valve housing body toward the valve housing body by the predetermined distance, so as to cause the melting provided by the beam to spread from the valve housing body to the valve seat member.

With the third feature, the joint zones of the valve seat member and the valve housing body of the electromagnetic fuel injection valve can be welded to each other, while avoiding a poor weld such as cracking to the utmost. In addition, even during service of the valve seat member and the valve housing body, it is possible to prevent a cracking from occurring in the weld zones of the valve seat member and the valve housing body.

According to a fourth aspect and feature of the present invention, in addition to any one of the first to third features, the distance of offsetting of the point of irradiation of the beam with respect to the joint surfaces is in a range of 0.5 to 1.5 mm.

With the fourth feature, the welding strengths of both the members can be ensured, while avoiding the cracking of the high-hardness member.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of an embodiment with. reference to the accompanying drawings.

Figure 1:
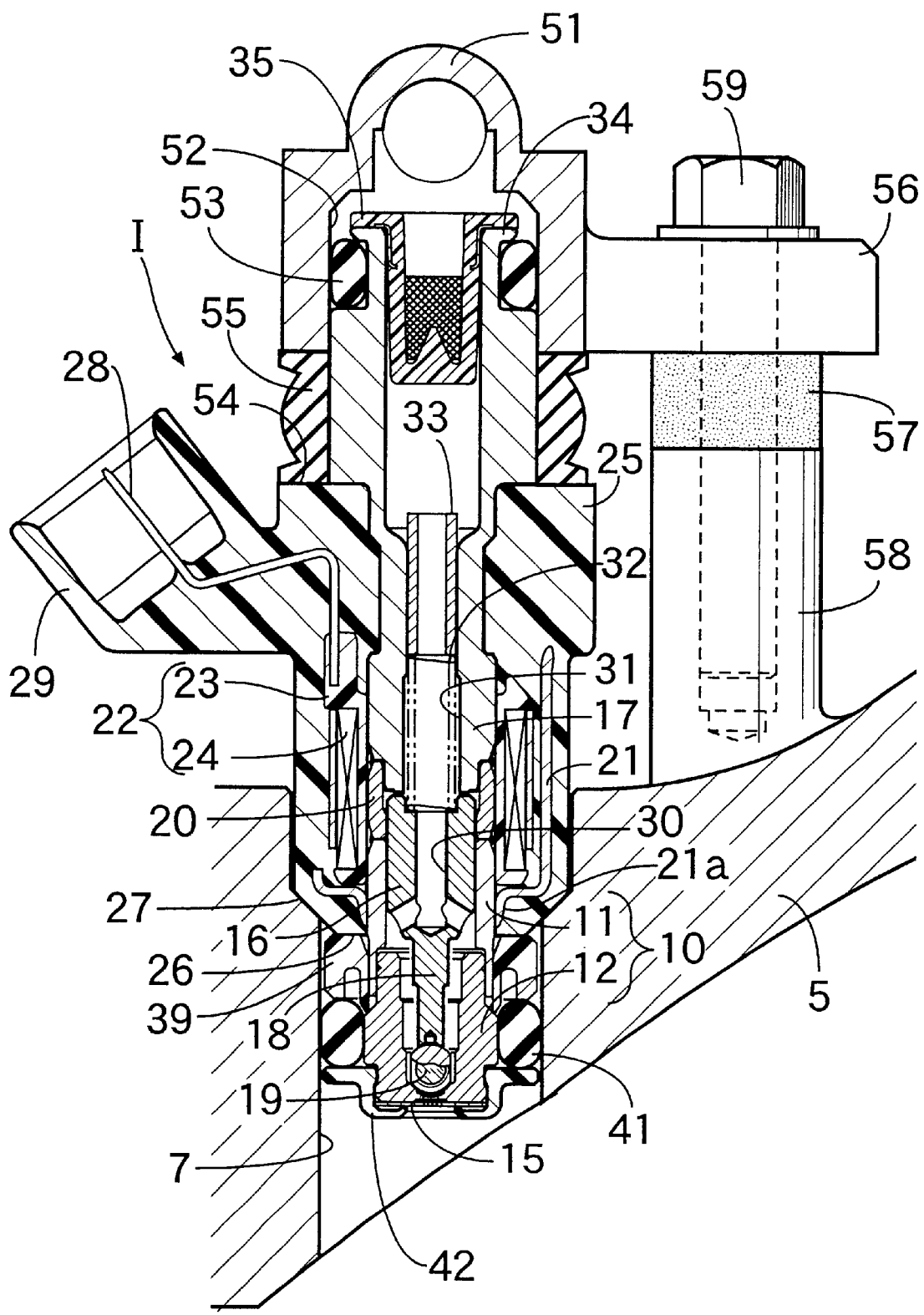
FIG. 1 is a vertical sectional view of an electromagnetic fuel injection valve for an internal combustion engine, which is made utilizing an embodiment of the present invention.
Figure 2:
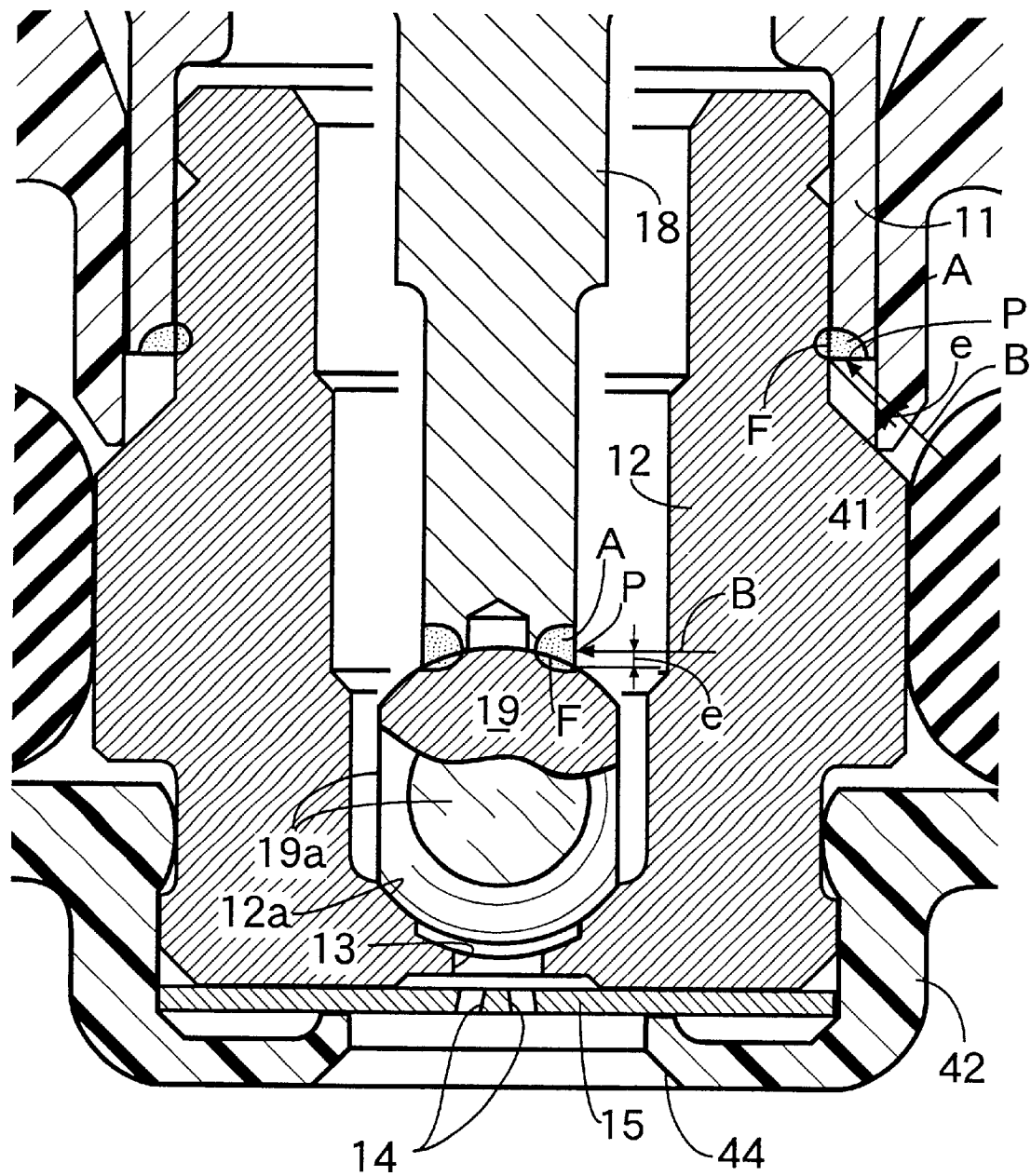
FIG. 2 is an enlarged view of an essential portion shown in FIG. 1.

Referring first to FIGS. 1 and 2, a valve housing 10 of an electromagnetic fuel injection valve I for an internal combustion engine is comprised of a cylindrical valve housing body 11 (made of a magnetic material), and a bottomed cylindrical valve seat member 12 which is fitted and welded to an inner peripheral surface of a front end of the valve housing body 11. The valve seat member 12 includes a valve bore 13 which opens into a front end face of the valve seat member, and a conical valve seat 12a connected to a rear edge of the valve bore 13. An injector plate 15 made of a steel is welded over its entire periphery to the front end face of the valve seat member 12, and have a plurality of (a pair in the illustrated embodiment) fuel injection bores 14 communicating with the valve bore 13.

A movable core 16 is accommodated in the valve housing body 11, and a spherical valve member 19 is welded to a valve rod 18 integrally and projectingly provided at a front end of the movable core 16, such that the member 19 can be seated on the valve seat 12a. Sides (in four directions) of the valve member 19 surrounding an axis of the valve rod 18 are each formed into a flat surface 19a, so that a fuel flow path around the valve member is as large as possible.

A sliding-movement guide tube 20 (made of a non-magnetic material) is welded over its entire periphery to a rear end face of the valve housing body 11, and the movable core 16 is slidably supported by an inner peripheral surface of the sliding-movement guide tube 20.

A stationary core 17 is fitted and welded over its entire periphery to an inner peripheral surface of a rear end of the sliding-movement guide tube 20, and the movable core 16 is opposed to a front end face of the stationary core 17 with a clearance corresponding to an opening stroke of the valve member 19.

A small-diameter portion 21a of a stepped cylindrical coil housing 21 (made of a magnetic material) is fitted and welded to an outer peripheral surface of the rear end of the valve housing body 11. A coil assembly 22 is accommodated in the coil housing 21 to surround a rear end of the valve housing 10, the sliding-movement guide tube 20 and the movable core 16. The coil assembly 22 comprises a bobbin 23 and a coil 24 wound around the bobbin 23. The coil housing 21, the coil assembly 22 and the stationary core 17 are sealed within a covering member 25 made of a synthetic resin. The covering member 25 is formed at its front end with a step 26 rising radially from the outer periphery of the valve housing body 11, and a tapered stopper face 27 increased in diameter as being farther rearwards from an outer peripheral edge of the step 26. A coupler 29 is integrally connected to an intermediate portion of the covering member 25, and has a connecting terminal 28 connected to the coil 24.

The stationary core 17 has a hole 31 communicating with the inside of the valve housing 10 through a through-bore 30 in the movable core 16. Accommodated in the hole 31 are a coiled valve spring 32 for biasing the movable core 16 in the direction to seat on the valve seat 12a, and a pipe-shaped retainer 33 which supports a rear end of the valve spring 32. The retainer 33 is press-fitted to an inner peripheral surface of the hole 31, and the set load of the valve spring 32 is regulated by regulating the depth of press-fitting of the retainer. Further, an inlet tube 34 is integrally connected to a rear end of the stationary core 17 to communicate with the hole 31 in the stationary core 17 through the pipe-shaped retainer 33, and a fuel filter 35 is mounted in the inlet tuber 34.

A sealing/positioning ring 39 made of a synthetic resin is fitted over an outer periphery of the valve housing body 11 exposed forwards from the step 26 of the covering member 25, so that the sealing/positioning ring 39 abuts against the step 26. A cap 42 made of a synthetic resin is resiliently mounted at a front end of the valve seat member 12, and an O-ring 41 is mounted around the outer periphery of the valve seat member 12 between the cap 42 and the sealing/positioning ring 39.

The cap 42 has an opening 44 in its front surface, so that it does not disturb the injection of fuel from the fuel injection bore 14.

A supply port portion 52 of a fuel-dispensing pipe 51 is fitted over an outer periphery of the inlet tube 34 of the electromagnetic fuel injection valve I with a seal member 53 interposed therebetween. In this case, a resilient member 55 for urging the stopper face 27 into abutment against an intake manifold 5 is interposed between the fuel-dispensing pipe 51 and the intermediate step 54 of the covering member 25. The fuel-dispensing pipe 51 has a mounting boss 56 at one side. The mounting boss 56 is secured to a support boss 58 on an outer surface of the intake manifold 5 by a bolt 59 with an insulator collar 57 interposed therebetween. In this manner, a state of close contact of the O-ring 41 with an inner peripheral surface of a mounting bore 7 is maintained.

In a state in which the coil 24 has been deenergized, the movable core 16 and the valve member 19 have been urged forwards by a biasing force of the valve spring 32, whereby the valve member 19 has been seated onto the valve seat 12a. Therefore, a high-pressure fuel supplied from the fuel-dispensing pipe 51 through the fuel filter 35 and the inlet tube 34 into the valve housing 1 is retained within the valve housing 1.

When the coil is energized, a magnetic bundle produced by such energization runs in sequence through the stationary core 17, the movable core 16, the valve housing 10 and the coil housing 21, and the movable core 16 is attracted to the stationary core 17 with the valve member 19 by a magnetic force, thereby opening the valve seat 12a. Thus, the high-pressure in the valve housing 10 is injected through the fuel injection bore 14 toward an intake valve 6.

The valve member 19 and the valve rod 19 having the movable core 17, as well as the valve seat member 12 and the valve housing body 11 are welded to each other by a beam-welding process according to the present invention.

Figure 3:
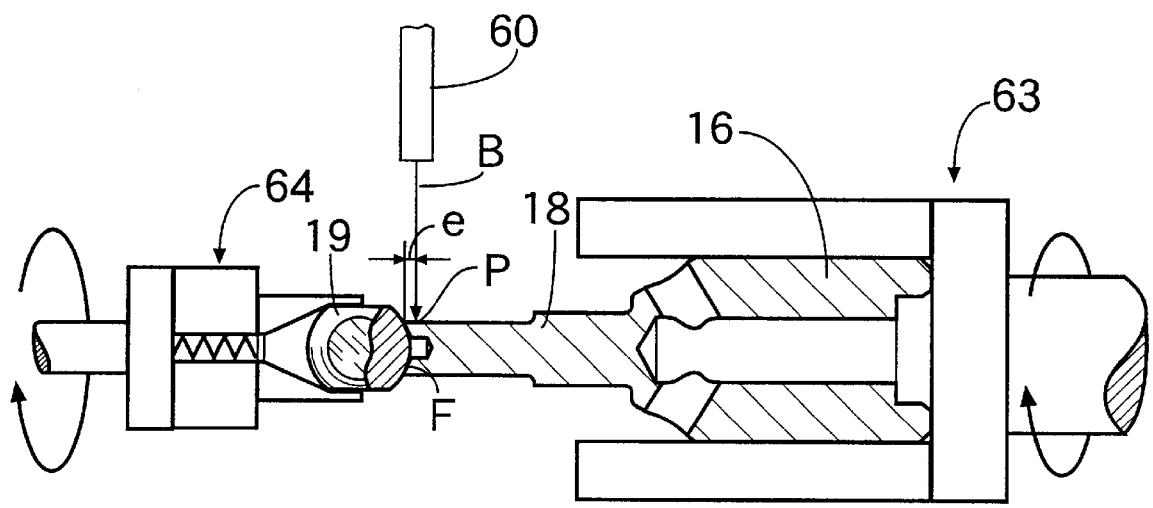
FIG. 3 is a side view of an apparatus for beam-welding the essential portion shown in FIG. 2.

First, the beam-welding process according to the present invention for welding the valve member 19 and the valve rod 18 to each other will be described below with reference to FIGS. 2 and 3.

The valve member 19 is made of a high-hardness material which has been hardened. For example, the valve member 19 is made of a material cut from a martensite stainless steel (SUS440C) or an SK material and then subjected to a hardening. Therefore, the valve member 19 has a high wear resistance. On the other hand, the valve rod 18 is made of a low-hardness material. For example, the valve rod 18 may be made of a material similar to the material for the valve member 19, but not modified, or a material cut from SVM, an austenite or ferrite stainless, which is not hardened. Each of joint surfaces F of the valve member 19 and the valve rod 18 is formed into a spherical surface.

In welding the valve member 19 and the valve rod 18 to each other, the movable core 16 which is integral with the valve rod 18 is retained by a first jig 63, and the valve member 19 is brought into close contact with the valve rod 18 at the joint surfaces F, while being retained by a second jig 64.

In such state, a laser torch 60 is disposed, so that a point P of irradiation of a laser beam B emitted from the laser torch 60 is a location offset from the joint surfaces F of the valve member 19 and the valve rod 18 toward the low-hardness valve rod 18 by a predetermined distance e.

When a laser beam B is then emitted from the laser torch 60 while synchronously rotating the first and second jigs 63 and 64, the melting A first occurs in the valve rod 18 and then spreads to the periphery of the valve rod 18 to ultimately reach the valve member 19, because the point P of irradiation of the leaser beam is the location offset from the joint surfaces F of the valve member 19 and the valve rod 18 toward the valve rod 18. In this manner, the melting in the valve member 19 is advanced relatively slowly without reception of a direct heat input provided by the laser beam B and hence, the valve member 19 is not brought into a rehardened state. Moreover, the low-hardness material of the valve rod 18 is molten into the high-hardness material of the valve member 19, and a crack-causing element in the high-hardness material of the valve member 19 is diluted with the low-hardness material. Further, the melting of the high-hardness material of the valve member 19 is smaller than that of the low-hardness material of the valve rod 18 and hence, the variation in temperature to the solidification of the high-hardness material is also relatively small and thus, the precipitation of carbide from the valve member 19 can be inhibited.

Consequently, while the first and second jigs 63 and 64 are being rotated in one rotation, the joint zones of the valve member 19 and the valve rod 18 can be welded, while avoiding a poor weld such as cracking to the utmost. Even during service of the valve member 19 and the valve rod 18, it is possible to prevent a cracking from occurring in the weld zones of the valve member 19 and the valve rod 18.

The process for beam-welding the valve seat member 12 and the valve housing body 11 to each other will be described below with reference to FIG. 2.

The valve seat member 12 is made of a high-hardness material, as is the valve member 19, and the valve housing body 11 is made of a low-hardness material, as is the valve rod 18.

In welding the valve seat member 12 and the valve housing body 11 to each other, first, the rear end of the valve seat member 12 is fitted into the valve housing body 11 at a predetermined depth. In such state, the laser torch 60 is disposed such that the direction of the laser beam B emitted from the laser torch 60 is oblique with respect to the end face of the valve housing body 11, and the point P of irradiation assumes a location offset from the joint surfaces F of the valve seat member 12 and the valve housing body 11 toward the low-hardness valve housing body 11 by a predetermined distance e. Even in this case, if the laser beam B is emitted from the laser torch 60, while synchronously rotating the valve seat member 12 and the valve housing body 11 by jigs (not shown), joint zones of the valve seat member 12 and the valve housing body 11 can be welded to each other by an action similar to that in the welding of the valve member 19 and the valve rod 18, while avoiding a poor weld such as cracking to the utmost. Even during service of the valve seat member 12 and the valve housing body 11, it is possible to prevent a cracking from occurring in the weld zones of the valve seat member 12 and the valve housing body 11.

Figure 4:
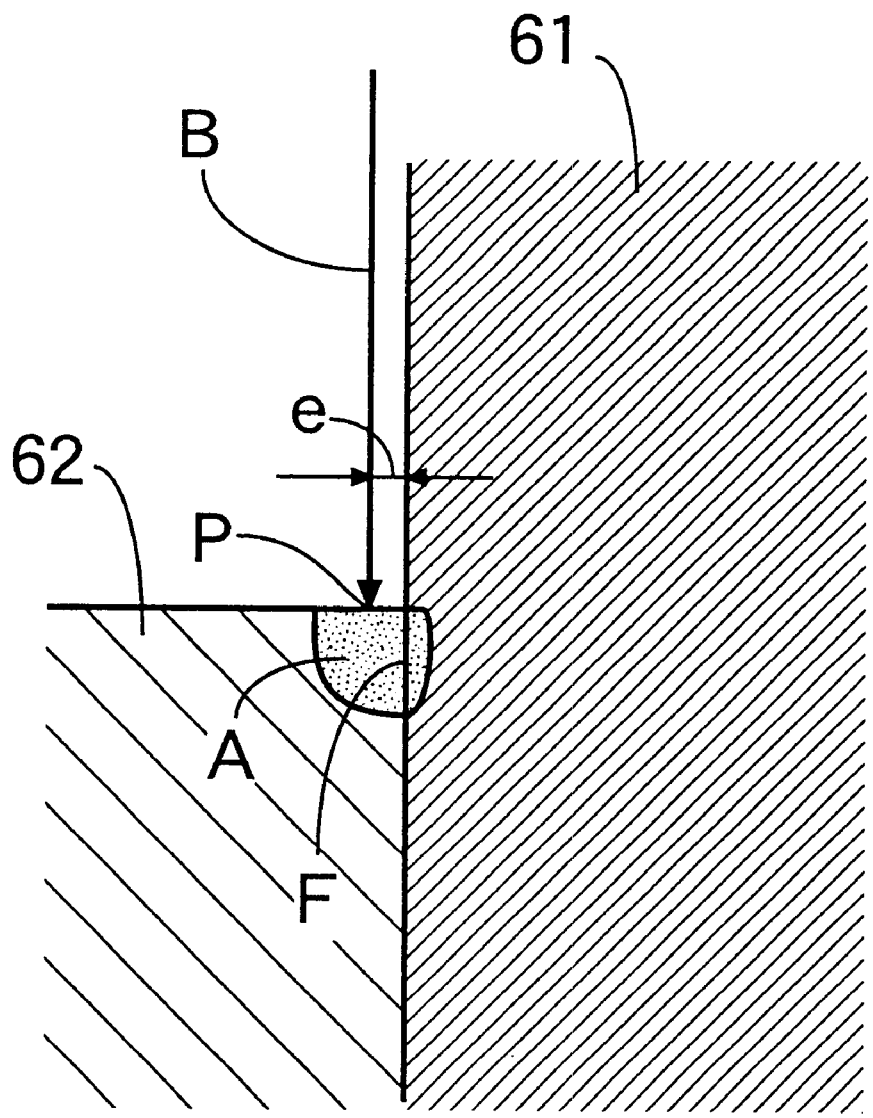
FIG. 4 is a sectional view showing another embodiment of the present invention.

FIG. 4 shows another embodiment of the present invention. To weld a low-hardness member 62 to a side of a high-hardness member 61, the laser torch 60 is disposed such that the direction of a laser beam B emitted from the laser torch 60 is substantially parallel to the side of the high-hardness member 61, and a point P of irradiation is at a location offset from joint surfaces F of both the members 61 and 62 toward the low-hardness member 62 by a predetermined distance e. If the laser beam B is then emitted from the laser torch 60, joint zones of the high-hardness member 61 and the low-hardness member 62 can be welded to each other by an action similar to that in the previous embodiment, while avoiding a poor weld such as cracking to the utmost. Even during service of both the members 61 and 62, it is possible to prevent a cracking from occurring in the weld zones of both the members 61 and 62.

As a result of an experiment, it is desirable in each of the embodiments that the distance e of offsetting of the point P of irradiation of the laser beam B from the joint surfaces F of the high-hardness member 12, 19, 61 and the low-hardness member 11, 18, 62 toward the low-hardness member 11, 18, 62 is set in a range of 0.5 to 1.5 mm. The reason is as follows: If the distance of offsetting of the irradiation point P is shorter than 0.5 mm, the input of heat into the high-hardness member 12, 19, 61 by the laser beam is violent, resulting in a reduced cracking-preventing effect. If the distance of offsetting of the irradiation point P exceeds 1.5 mm, the melting of the high-hardness member 12, 19, 61 is too small, thereby making it difficult to ensure a welding strength. A distance e of offsetting most effective for ensuring a welding strength, while avoiding the cracking of the high-hardness member 12, 19, 61, is approximately 1.0 mm.

Although the embodiments of the present invention have been described in detail, it will be understood that the present invention is not limited to the above-described embodiments, and various modifications in design may be made without departing from the spirit and scope of the invention defined in claims. For example, an electron beam may be used in the welding in place of the laser beam.

What is claimed is:

1. A process for beam-welding two members different in hardness from each other, in which joint surfaces of a high-hardness member and a low-hardness member are welded to each other by use of a laser beam or an electron beam, wherein a point of irradiation of the laser beam or the electron beam is set at a location offset from the joint surfaces of said high-hardness member and said low-hardness member toward said low-hardness member by a predetermined distance, so as to cause the melting provided by said beam to spread from said low-hardness member to said high-hardness member, wherein said high-hardness member is a spherical valve member of an electromagnetic fuel injection valve, and said low-hardness member is a valve rod welded to said valve member; and wherein the laser beam or the electron beam is emitted to the point of irradiation offset from the joint surfaces of said valve member and said valve rod toward said valve rod by said predetermined distance, so as to cause the melting provided by the beam to spread from said valve rod to said valve member.

2. A process for beam-welding two members different in hardness from each other, in which joint surfaces of a high-hardness member and a low-hardness member are welded to each other by use of a laser beam or an electron beam, wherein a point of irradiation of the laser beam or the electron beam is set at a location offset from the joint surfaces of said high-hardness member and said low-hardness member toward said low-hardness member by a predetermined distance, so as to cause the melting provided by said beam to spread from said low-hardness member to said high-hardness member, wherein said high-hardness member is a valve seat member of an electromagnetic fuel injection valve, and said low-hardness member is a valve housing body welded to a rear end of said valve seat member; and wherein the laser beam or the electron beam is emitted to the point of irradiation offset from the joint surfaces of said valve seat member and said valve housing body toward said valve housing body by said predetermined distance, so as to cause the melting provided by said beam to spread from said valve housing body to said valve seat member.

3. A process for beam-welding two members different in hardness from each other according to any one of claims 1 and 2 wherein the distance of offsetting of the point of irradiation of the beam with respect to said joint surfaces is in a range of 0.5 to 1.5 mm.

\* \* \* \* \*